United States Patent
Kim et al.

(10) Patent No.: US 9,332,484 B2
(45) Date of Patent: *May 3, 2016

(54) METHOD AND APPARATUS FOR OPERATING WITHIN WHITE SPACE BAND USING MESSAGE INDICATING WHETHER AVAILABLE CHANNEL INFORMATION IS VALID IN WIRELESS SYSTEM

(75) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/817,198

(22) PCT Filed: Jun. 23, 2011

(86) PCT No.: PCT/KR2011/004599
§ 371 (c)(1),
(2), (4) Date: Feb. 15, 2013

(87) PCT Pub. No.: WO2012/023700
PCT Pub. Date: Feb. 23, 2012

(65) Prior Publication Data
US 2013/0231108 A1    Sep. 5, 2013

Related U.S. Application Data

(60) Provisional application No. 61/373,896, filed on Aug. 16, 2010, provisional application No. 61/375,293, filed on Aug. 20, 2010, provisional application No. 61/375,301, filed on Aug. 20, 2010, provisional
(Continued)

(51) Int. Cl.
*H04W 4/00* (2009.01)
*H04W 48/16* (2009.01)
*H04W 72/04* (2009.01)
*H04W 16/14* (2009.01)

(52) U.S. Cl.
CPC .......... *H04W 48/16* (2013.01); *H04W 72/0406* (2013.01); *H04W 16/14* (2013.01)

(58) Field of Classification Search
CPC ...... H04W 48/16; H04W 48/18; H04W 48/12
USPC ........................ 455/434, 509–517, 452.1–457
See application file for complete search history.

(56) References Cited

U.S. PATENT DOCUMENTS 6,604,038 B1 * 8/2003 Lesesky et al. ................. 701/49
2010/0048234 A1    2/2010 Singh
(Continued)

FOREIGN PATENT DOCUMENTS

CA          2799161 A1    11/2011

OTHER PUBLICATIONS

International Search Report and Written Opinion issued in corresponding International Patent Application No. PCT/KR2011/004599 dated Dec. 28, 2011.
(Continued)

*Primary Examiner* — Khalid Shaheed
(74) *Attorney, Agent, or Firm* — Morgan, Lewis & Bockius LLP (57) ABSTRACT

A method and apparatus for operating within a white space band using a message indicating whether an available channel information is valid in the wireless system are disclosed. In a method for a first station (STA) to operate as an unlicensed device which is permitted to operate on an available channel within a White Space (WS) band of a wireless system, comprises: receiving a message indicating whether an available channel information of the first STA is valid from a second STA, wherein the available channel is a channel not used by a licensed device, wherein the message includes a Map ID of a current valid available channel information; and determining whether an existing available channel information of the first STA is valid by comparing a Map ID of the existing available channel information of the first STA with the Map ID included in the received message.

13 Claims, 5 Drawing Sheets

Related U.S. Application Data application No. 61/379,733, filed on Sep. 3, 2010, provisional application No. 61/387,983, filed on Sep. 30, 2010, provisional application No. 61/393,365, filed on Oct. 15, 2010, provisional application No. 61/408,668, filed on Nov. 1, 2010.

(56) References Cited

U.S. PATENT DOCUMENTS

| | | | |
|---|---|---|---|
| 2011/0280180 A1* | 11/2011 | McCann et al. | 370/328 |
| 2012/0208558 A1* | 8/2012 | Bajko et al. | 455/456.1 |

OTHER PUBLICATIONS

LG Electronics, "Normative Text for White Space Map", IEEE 802.11 Wireless LANs, IEEE 802.11-10/0790r2, Jul. 12, 2010.

LG Electronics, "TVWS Enablement Scenarios", IEEE 802.11 Wireless LANs, IEEE 802.11-10/0720r0, Jun. 29, 2010.

LG Electronics, "Amendment proposal for TV White Spaces Operation", IEEE 802.11 Wireless LANs, IEEE 802.11-10/0263r3, Apr. 27, 2010.

Office Action dated Nov. 9, 2015, issued by the Canadian Intellectual Property Office in Canadian Patent Application No. 2,808,583.

* cited by examiner

| Element ID | Length | WSM type | WSM information |
|---|---|---|---|

Octets:     1          1          1          variable

Fig. 5

These three fields are repeated, as determined by the Length field

| Device Type | Map ID | Channel Number | Maximum Power Level | Validity (Optional) |
|---|---|---|---|---|

Octets:     1          1          1          1          1

Fig. 6

| Type | Map version |
|---|---|

Bits     0     1 - 7

Fig. 7

| Element ID | Length | Map ID |
|---|---|---|

Octets:    1    1    1

Fig. 8

| Category | Action | Contact Verification Signal IE |
|---|---|---|

Octets:    1    1    3

Fig. 9

| Info ID | Length | Map ID | Channel Map |
|---------|--------|--------|-------------|

Octets:   1    2    1    N

Fig. 10

| Element ID | Length | WSM Notification Hash |
|------------|--------|-----------------------|

Octets:   1    1    8

Fig. 11

| Category | Public Action | WSM Notification Hash |
|----------|---------------|-----------------------|

Octets:   1    1    8

Fig. 12

| Category | Action Value | Dialog Token | Device ID (optional) |
|----------|--------------|--------------|----------------------|

Octets:   1    1    1    variable

Fig. 13

| Category | Action Value | Dialog Token | Status Code | White Space Map element |
|---|---|---|---|---|

Octets:     1          1          1          1          variable

Fig. 14

| Element ID | Length | Delivery Offset | Delivery Interval |
|---|---|---|---|

Octets:    1          1          1          1

Fig. 15

METHOD AND APPARATUS FOR OPERATING WITHIN WHITE SPACE BAND USING MESSAGE INDICATING WHETHER AVAILABLE CHANNEL INFORMATION IS VALID IN WIRELESS SYSTEM

TECHNICAL FIELD

The present invention relates to a wireless system, and more particularly, to a method and apparatus for operating within a white space band using a message indicating whether an available channel information is valid in the wireless system.

BACKGROUND ART

Wireless system comprises various network systems including a Wireless Local Area Network (WLAN) system, a cellular network system, etc. In this document, for the convenience of explanation, the present invention is described as embodied in a WLAN system. However, it should be noted the WLAN system is used only for the exemplary purpose.

Standard for WLAN technology has been developed as the Institute of Electrical and Electronics Engineers (IEEE) 802.11 standard. IEEE 802.11a and 802.11b use an unlicensed band at 2.5 GHz or 5 GHz. IEEE 802.11 b provides a transmission rate of 11 Mbps and IEEE 802.11 a provides a transmission rate of 54 Mbps. IEEE 802.11g applies Orthogonal Frequency-Division Multiplexing (OFDM) at 2.4 GHz to provide a transmission rate of 54 Mbps. IEEE802.11n applies Multiple Input Multiple Output (MIMO)-OFDM to provide a transmission rate of 300 Mbps for four spatial streams. IEEE 802.11n supports a channel bandwidth up to 40 MHz to provide a transmission rate of 600 Mbps.

Currently, IEEE 802.11af standard that specifies operation of an unlicensed device in a TV White Space (TVWS) band is being developed.

A TVWS includes an Ultra High Frequency (UHF) band and a Very High Frequency (VHF) band as a frequency allocated to a broadcast TV and refers to a frequency band in which use of an unlicensed device is permitted under the condition that it does not hinder communication of a licensed device operating at a corresponding frequency band. The licensed device includes a TV, a wireless microphone, etc. The licensed device may be called an incumbent user or a primary user.

Operation of all unlicensed devices is permitted in frequency bands of 512 to 608 MHz and 614 to 698 MHz except in a few special cases. However, in frequency bands of 54 to 60 MHz, 76 to 88 MHz, 174 to 216 MHz, and 470 to 512 MHz, only communication between fixed devices is permitted. The fixed devices refer to devices which transmit signals only in a determined location. An IEEE 802.11 TVWS terminal refers to an unlicensed device operating using an IEEE 802.11 Media Access Control (MAC) layer and a physical layer (PHY) in a TVWS spectrum.

An unlicensed device which desires to use a TVWS should provide a protection function for a licensed device. Accordingly, the unlicensed device must confirm whether the licensed device occupies a corresponding band before starting signal transmission in the TVWS.

The unlicensed device may confirm whether a corresponding band is being used by the licensed device by performing spectrum sensing. A spectrum sensing mechanism includes energy detection and feature detection. If strength of a signal received through a specific channel is above a prescribed value or if a DTV preamble is detected, the unlicensed may determine that the licensed device is using the specific channel. If it is determined that the licensed device is using a channel immediately adjacent to a currently used channel, the unlicensed device should lower transmission power thereof.

However, if a station (STA) operating as an unlicensed device depends only on frequency sensing to acquire available channel information, the STA may encounter an increased burden due to a sensing action for a TVWS and a procedure may be delayed. Meanwhile, an unlicensed device may obtain available channel information information in a corresponding area by accessing a geolocation Database (DB) through the Internet or a dedicated network. The geolocation DB stores and manages information about registered licensed devices and information about available channels which dynamically vary according to geographic location and channel use time of the licensed devices.

As described above, available channels within a TVWS dynamically vary over time. However, since an STA operating as an unlicensed device in a TVWS should use only available channels to protect a licensed device, it should determine whether available channels have been changed.

DISCLOSURE OF INVENTION

Technical Problem

An object of the present invention lies in providing a method and apparatus for transmitting and receiving a message indicating whether an available channel information is valid so that a STA operating as an unlicensed device in a white space band can efficiently determine whether available channels have been changed.

It is to be understood that technical objects to be achieved by the present invention are not limited to the aforementioned technical object and other technical objects which are not mentioned will be apparent from the following description to those of ordinary skill in the art to which the present invention pertains.

Solution to Problem

In one aspect of the present invention, provided herein is a method for a first station (STA) to operate as an unlicensed device which is permitted to operate on an available channel within a White Space band of a wireless system. In the method, the first STA receives the message indicating whether an available channel information of the first STA is valid from a second STA, wherein the available channel is a channel not used by a licensed device, wherein the message includes a Map ID of a current valid available channel information, and determines whether an existing available channel information is valid by comparing a Map ID of the existing available channel information with the Map ID included in the received message.

The first STA may determine that the existing available channel information is valid if the Map ID of the existing available channel information is the same as the Map ID included in the received message, and may determine that the existing available channel information is invalid if the Map ID of the existing available channel information is different from the Map ID included in the received message.

The first STA may request the second STA to transmit a valid available channel information upon determining that the existing available channel information is invalid.

The first STA may receive the valid available channel information from the second STA.

The second STA may an STA which had provided the first STA with the existing available channel information of the first STA.

In this embodiment, the available channel information comprises a White Space Map (WSM).

The Map ID included in the message may include a Map version indicating a version of the WSM, and the value of the Map version may increase by one whenever the WSM is updated.

The message may further include a Length field indicating the length of information included in the message in units of octets and the Length field may be set to 1.

The message may be received at a preset interval.

The first STA may stop transmitting and receiving signals in the white space band when the message is not received at the preset interval.

In another aspect of the present invention, provided herein is a method of a second station (STA) for controlling a first STA to operate as an unlicensed device which is permitted to operate on an available channel within a White Space (WS) band of a wireless system. In this method, the second STA transmits a message indicating whether an available channel information of the first STA is valid to the first STA, wherein the available channel is a channel not used by a licensed device, wherein the message includes a Map ID of a current valid available channel information; and wherein the MAP ID of the current valid available channel information is used by the first STA to determine whether the existing available channel information of the first STA is invalid based on a comparison of the Map ID of the current valid available channel information to a Map ID of the existing available channel information.

The method may further comprises: receiving a request for a valid available channel information from the first STA, when the Map ID of the current valid available channel information is different from the Map ID of the existing available channel information of the first STA; and transmitting the valid available channel information to the first STA.

The second STA may be a STA which had provided the first STA with the existing available channel information of the first STA.

In this embodiment, the available channel information may comprise a White Space Map (WSM).

The Map ID, included in the transmitted message, may include a Map version indicating a version of the WSM, and wherein a value of the Map version may increase by one whenever the WSM is updated.

The message may further include a Length field indicating the length of information included in the message in units of octets, and the Length field is set to 1.

In another aspect of the present invention, provided herein is a first station (STA) operating as an unlicensed device which is permitted to operate on an available channel within a White Space band of a wireless system. The first STA includes a reception module for receiving a message indicating whether an available channel information of the first STA is valid from a second STA, wherein the available channel is a channel not used by a licensed device, wherein the message includes a Map ID of a current valid available channel information; and a processor for determining whether an existing available channel information of the first STA is valid by comparing a Map ID of the existing available channel information of the first STA with the Map ID included in the received message.

In further another aspect of the present invention, provided herein is a second station (STA) controlling a first STA to operate as an unlicensed device which is permitted to operate on an available channel within a White Space (WS) band of a wireless system. The second STA comprises: a transmission module for transmitting a message indicating whether an available channel information of the first STA is valid to the first STA, wherein the available channel is a channel not used by a licensed device, wherein the message includes a Map ID of a current valid available channel information; and wherein the Map ID of the current valid available channel information is used by the first STA to determine whether the existing available channel information of the first STA is invalid based on a comparison of the Map ID of the current valid available channel information with a Map ID of the existing available channel information.

Advantageous Effects of Invention

According to exemplary embodiments of the present invention, an STA operating as an unlicensed device in a white space band can efficiently determine whether available channels have been changed.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Hereinafter, exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full under-standing of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form. The same reference numbers will be used throughout the drawings to refer to the same or like parts.

First, a general configuration of a WLAN system will be described with reference to FIGS. 1 and 2.

Figure 1:
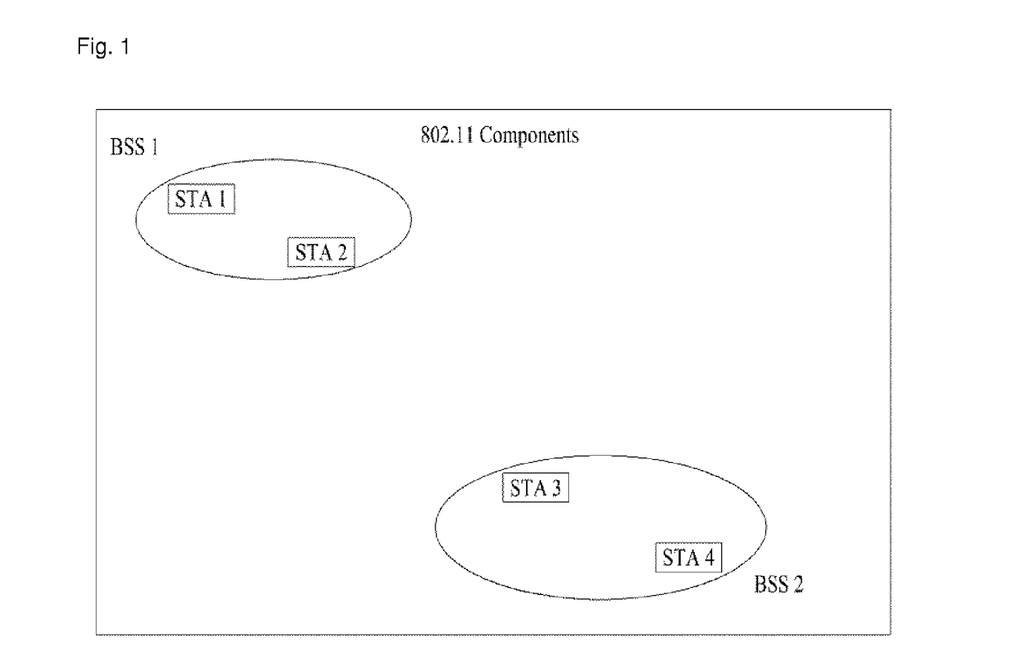
FIG. 1 is a diagram illustrating an example of the configuration of a WLAN system.

FIG. 1 is a diagram illustrating an example of the configuration of a WLAN system.

As shown in FIG. 1, the WLAN system includes one or more Basis Service Sets (BSSs). A BSS is a set of STAs which are successfully synchronized to communicate with one another.

An STA is a logical entity that contains a Medium Access Control (MAC) and a physical layer interface to a wireless medium, and includes an Access Point (AP) and a non-AP STA. A portable terminal manipulated by a user among STAs is a non-AP STA. If we simply say STA, it may indicate a non-AP STA. The non-AP STA may also be referred to as a terminal, a Wireless Transmit/Receive Unit (WTRU), a User Equipment (UE), a Mobile Station (MS), a Mobile Terminal, a Mobile Subscriber Unit, etc.

The AP is an entity that provides access to a Distribution System (DS) to associated STAs via a wireless medium. The AP may be referred to as a centralized controller, a Base Station (BS), a Node-B, a Base Transceiver System (BTS), a site controller, etc.

The BSS may be classified into an infrastructure BSS and an Independent BSS (IBSS).

The BSSs shown in FIG. 1 are IBSSs. An IBSS refers to a BSS which does not include an AP. Since the IBSS does not include an AP, it forms a self-contained network because no access to a DS is available.

Figure 2:
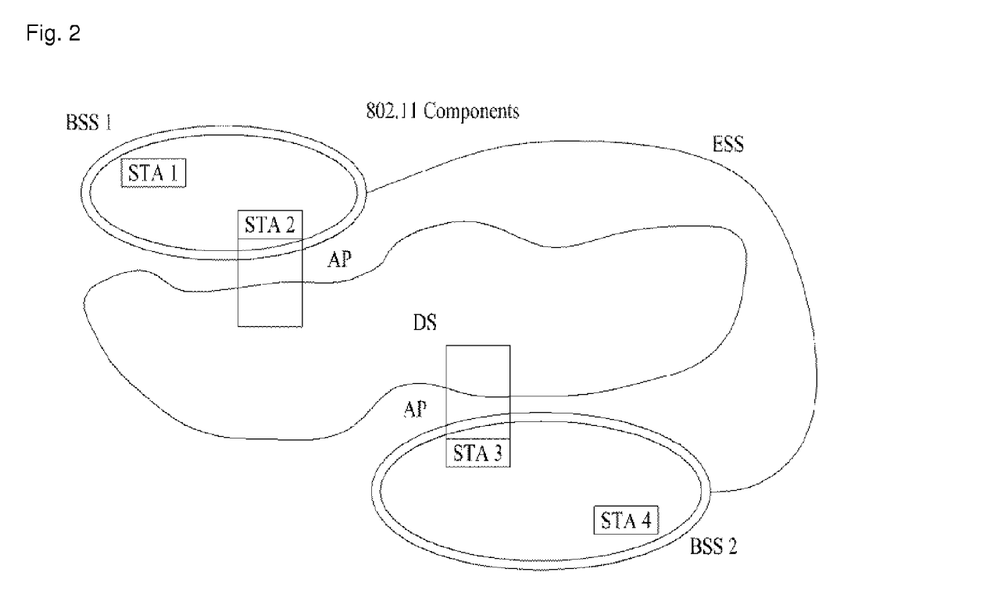
FIG. 2 is a diagram illustrating another example of the configuration of a WLAN system.

FIG. 2 is a diagram illustrating another example of the configuration of the WLAN system.

The BSSs shown in FIG. 2 are infrastructure BSSs. An infrastructure BSS includes one or more STAs and APs. Although communication between non-AP STAs in an infrastructure BSS is performed via an AP in principle, direct communication between the non-AP STAs may be performed when a direct link therebetween is established.

As shown in FIG. 2, a plurality of infrastructure BSSs may be interconnected by use of a DS. A plurality of BSSs connected through the DS is referred to as an Extended Service Set (ESS). STAs included in the ESS may communicate with one another. In the same ESS, a non-AP STA may move from one BSS to another BSS while performing seamless communication.

The DS is a mechanism for connecting a plurality of APs. The DS is not necessarily a network, and has no format limitation as long as a prescribed distribution service can be provided. For example, the DS may be a wireless network such as a mesh network, or may be a physical construction for interconnecting APs.

A spectrum which is not used by a licensed device is referred to as white space and this spectrum may be used by an unlicensed device. In order for an STA to operate in a white space spectrum, first of all, it is necessary to provide a protection scheme for an incumbent user. A TVWS includes a UHF band and a VHF band as a frequency allocated to a broadcast TV and refers to a frequency band in which use of an unlicensed device is permitted under the condition that it does not hinder communication of a licensed device operating in a corresponding frequency band.

In an exemplary embodiment of the present invention, a description of a TVWS band is given as an example. However, the present invention is not limited to the TVWS band and may be applied to all cases where an STA operates in a white space band.

In order for an STA to operate in a TVWS, a protection scheme for a licensed device should first be provided. Accordingly, the STA should determine available channels which are not used by a licensed device and can be used by an unlicensed device, and the STA should operate in the available channels.

An STA may determine availability of a TV channel using a spectrum sensing method and a method for determining a TV channel schedule by accessing a DB. DB information includes information about usage schedule of a specific channel of a licensed device at a specific location. An STA which desires to determine availability of a TV channel should acquire DB information based on its location information by accessing a DB via the Internet and this action should be performed in a time unit sufficient to protect the licensed device.

However, as compared with a bandwidth of each channel, 20 MHz, in 2.4 GHz and 5 GHz bands, a bandwidth of a TV channel is 6 MHz and therefore overhead is increased when all STAs perform sensing. In addition, access to the DB by all STAs also increases overhead. According to an exemplary embodiment of the present invention, an enabling STA transmits a White Space Map (WSM) including information about available channels to a dependent STA.

A WSM refers to information of a map form about channels which are available to an unlicensed device in a TVWS band based on channel information obtained from a DB by an enabling STA. The WSM includes an available channel information which can be used by an unlicensed device. Channels included in the available channel information are channels that legally protected signals do not use and are available to an unlicensed device when the unlicensed device accesses the DB. If the unlicensed device requests channels, which are available after a specific time from when the unlicensed device accesses the DB, the WSM may include information about channels and frequencies which are available from a corresponding time point. Alternatively, if the unlicensed device requests available channels through the DB, information about available channels and frequencies may be transmitted by signaling channels which are not available to the unlicensed device through the WSM. In an exemplary embodiment of the present invention, a description of the case where the WSM includes information about available channels is given. However, the present invention is not limited to such a case.

Channels of available channel information may have granularity of a minimum unit provided by a DB. Namely, if a channel of a minimum unit provided by a TV band DB for a TVWS is a TV channel, the available channel information is a list of TV channels which are available to an unlicensed device. For example, in Korea and the U.S., the TV channel list may be a list of channels in units of bandwidths of 6 MHz and in other countries, it may be a list of channels in units of bandwidths of 8 MHz. According to a rule defined in a specific country and a regulatory domain, channels of the available channel information may be TV channels, or channel information for signaling other types of frequencies.

The WSM may be transmitted by an enabling STA to a dependent STA during an enablement process or after enablement has been successively performed. In a TVWS, available channels are dynamically changed over time. Accordingly, since an STA operating as an unlicensed device within the TVWS should operate using only the available channels to protect a licensed device, the STA should be aware of whether the available channels are changed. An embodiment of the present invention provides a method for transmitting and receiving a message indicating whether the WSM is valid so that the STA is able to efficiently determine changes in available channels.

Figure 3:
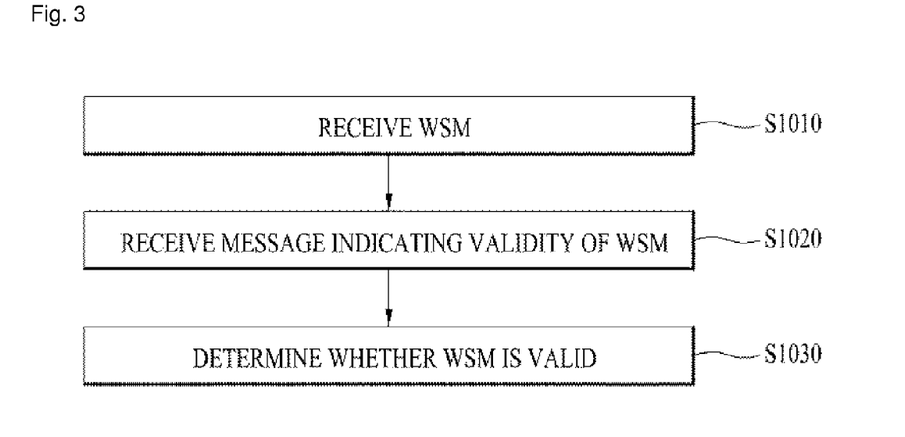
FIG. 3 is a flowchart illustrating a process for receiving a message indicating validity of a WSM according to an exemplary embodiment of the present invention.

Now, a method for transmitting and receiving a message indicating whether a WSM is valid will be described with reference to the accompanying drawings. FIG. 3 is a flowchart illustrating a process for receiving a message indicating validity of a WSM according to an exemplary embodiment of the present invention. Even though the method is explained in terms of operating within TVWS, it can be applied to other type of operation within a white space band.

As shown in FIG. 3, a dependent STA receives a WSM from an enabling STA in step S1010 during an enablement process or after enablement has been successively performed.

An unlicensed device operating in a TVWS band may be divided into an enabling STA and a dependent STA. The enabling STA is an STA that can enable the dependent STA. The enabling STA can transmit signals even when an enabling signal is not received and can initiate a network.

The enabling STA may register geolocation information in a DB and acquire an available channel information at a corresponding geolocation. The enabling STA is not necessarily a WLAN STA and may be a logical entity or a network server which can provide services related to enabling.

The dependent STA is an STA that can transmit signals only upon receiving an enabling signal and is controlled by the enabling STA. The dependent STA should be enabled only through the enabling STA and cannot be independently enabled.

The enabling STA may transmit a WSM by including a beacon frame, a probe response frame, a White Space Map announcement frame or White Space Map Response frame upon request from a dependent STA. WSM signals the available channel information obtained from the database. In case of US or Korea, it may signal the available signal an available channel number which may be a TV channel number and in other regulatory domains, it may signal available frequency information or a WLAN channel number. Additionally, the WSM should indicate a permissible maximum power value per available channel. Since available channels change according to time and place, it is desirable that the WSM specify the length thereof so as to support a variable length and specify a version so as to confirm whether it has been updated. The enabling STA may update a full channel list for available channel information included in the WSM or update only a partial channel.

Figure 4:
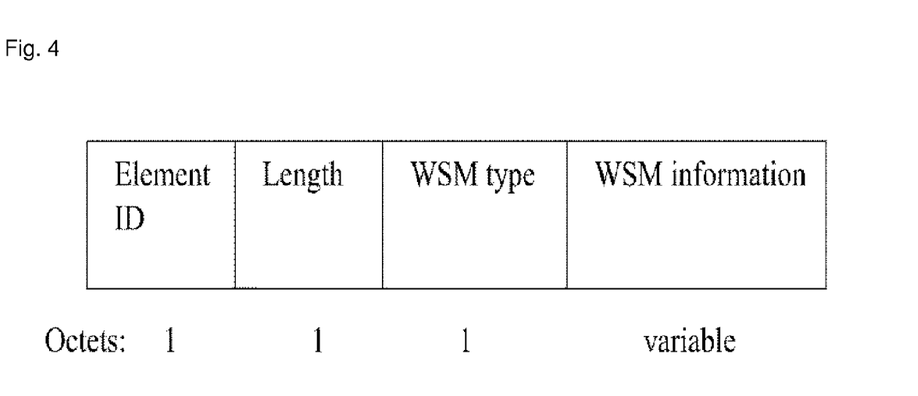
FIG. 4 is a diagram illustrating a WSM element.

FIG. 4 is a diagram illustrating a WSM element.

As shown in FIG. 4, the WSM element includes an Element ID field, a Length field, a WSM type field, and a WSM information field.

The Element ID field represents that a corresponding element is a WSM element. The Length field indicates the length of information included in the WSM element in units of octets. Namely, the Length field indicates the length of fields after the Length field in the WSM element.

The WSM type field indicates the type of WSM information. A value of the WSM type field may be as indicated in Table 1.

TABLE 1

| Name | WSM Type |
| --- | --- |
| Reserved | 0 |
| TV band WSM | 1 |
| Reserved | 2-255 |

A regulatory domain DB may vary according to a regulatory region and requirements of the regulatory region. A WSM generated based on available channel information of a TVWS obtained by accessing a TV band DB by an STA is a TV band WSM. That is, if the WSM type field is set to 1, the WSM is generated from the TV band DB and a channel list included in the WSM is a TV channel list which is available by an unlicensed device.

Figure 5:
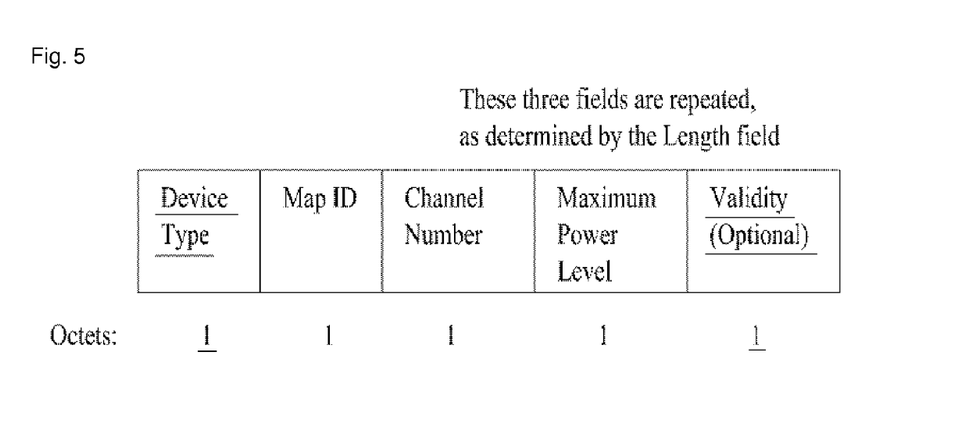
FIG. 5 is a diagram illustrating a format of a WSM information field.

FIG. 5 is a diagram illustrating a format of the WSM information field.

As shown in FIG. 5, the WSM information field may include a Device Type field, a Map ID field, a Channel Number field, a Maximum Power Level field, and a Validity field.

The Device Type field indicates a type of device to which the WSM is applied. Namely, the Device Type field may represent whether the WSM is for a fixed STA or for a personal/portable terminal STA.

Figure 6:
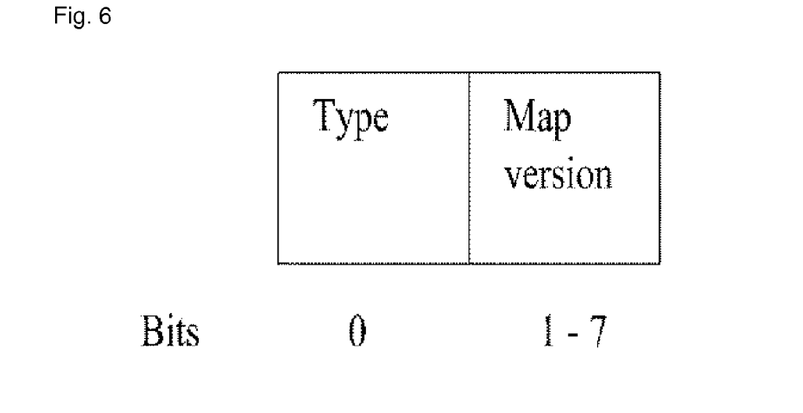
FIG. 6 is a diagram illustrating a Map ID field.

The Map ID field indicates an ID of the WSM information field and may be used to distinguish a corresponding WSM from other WSMs. FIG. 6 is a diagram illustrating the Map ID field. As shown in FIG. 6, the Map ID field includes a Type bit and a Map version bit.

The Type bit represents whether a channel list included in the WSM is a full channel list or a partial channel list. An enabling STA may transmit a WSM including information about all available channels most recently obtained from the DB at a WSM transmission time point or transmit a WSM including only partial channels among available channels in order to reduce overhead of a beacon frame or a probe frame in which the WSM is included. Accordingly, the type bit indicates whether a channel list included in a WSM is a full channel list or a partial channel list.

The Map version bit indicates a version of a WSM. Whenever available channel information obtained from a TV band DB is updated and thus a corresponding WSM is updated, a map version is increased by 1.

The Channel Number field indicates a number of a TV channel which is available to an unlicensed device in a TVWS. However, the present invention does not exclude the case of indicating an available channel in a different way instead of the channel number, for example, the case of indicating the available channel using an available frequency as will be described later. The Maximum Power Level field indicates a permissible maximum power in each available channel.

The Validity field indicates time information valid for an available channel. The Validity field may represent time information valid for each available channel or represent time information valid for the entire WSM. The validity field may vary according to device type and may be omitted according to device type.

An arbitrary method may be used to transmit the WSM. However, it is desirable to transmit the WSM to a dependent STA at regular intervals or whenever information of a DB is updated, in order to protect a licensed device. An enabling STA accesses a DB to acquire an available channel information and periodically transmits the WSM to a dependent STA to inform the dependent STA of available channels. If it is determined that the available channels are not present or if they are decreased, the enabling STA should inform dependent STAs so as not to operate in corresponding channels.

Referring back to FIG. 3, the dependent STA receives a message indicating validity of the WSM from the enabling STA in step S1020.

An exemplary embodiment of the present invention proposes two types as a message indicating validity of the WSM. The first type of message includes a Map ID of a currently valid WSM and the second type of message includes a Hash value to indicate whether the WSM has been updated.

Figure 7:
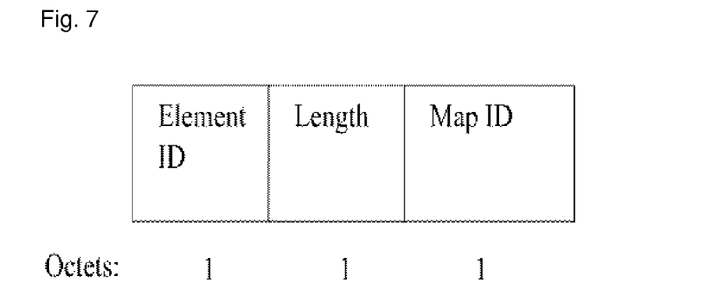
FIG. 7 is a diagram illustrating an element indicating validity of a WSM.
Figure 8:
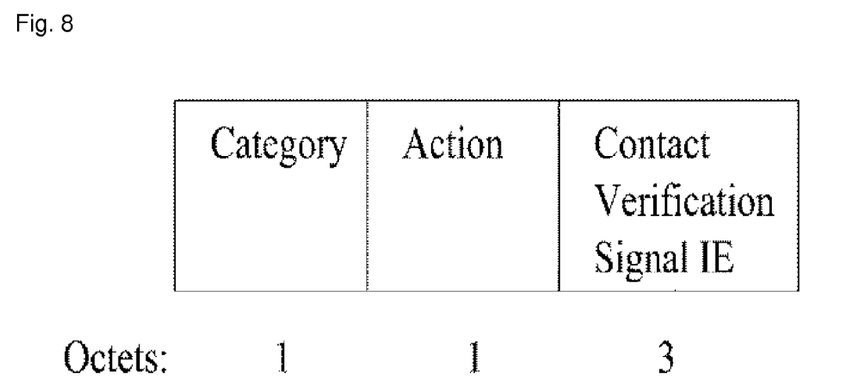
FIG. 8 is a diagram illustrating a frame indicating validity of a WSM.

The first type of message is described with reference to FIGS. 7 and 8. FIG. 7 is a diagram illustrating an element indicating validity of a WSM, and FIG. 8 is a diagram illustrating a frame indicating validity of a WSM.

Since an element indicating validity of the WSM may also be used for the purpose of confirming whether a dependent STA is still within a region which can receive signals from an enabling STA, it may be referred to as a Contact Verification Signal element. A frame indicating validity of the WSM may be referred to as a Contact Verification Signal frame. That is, the dependent STA should receive the Contact Verification Signal frame at a preset interval. If the Contact Verification Signal frame is not received at the preset interval, the dependent STA transmits a WSM request to the enabling STA. If no response is received from the enabling STA, the dependent STA stops transmission.

As shown in FIG. 7, the Contact Verification Signal element includes an Element ID field, a Length field, and a Map ID field.

The Element ID field represents that a corresponding element is a Contact Verification Signal element. The Length field indicates the length of information included in the Contact Verification Signal element in units of octets and is set to 1. That is, since the length of the Map ID field is one octet, the Length field is set to 1.

The Map ID field includes ID information of a currently valid WSM and has a format shown in FIG. 6. Namely, the Map ID field includes version information of a currently valid WSM.

As shown in FIG. 8, the Contact Verification Signal frame includes a Contact Verification Signal element. That is, an enabling STA may transmit the Contact Verification Signal frame including the Contact Verification Signal element.

The enabling STA transmits the Contact Verification Signal frame to a dependent STA to which the enabling STA provided a WSM in order to indicate validity of an existing WSM belonging to the dependent STA.

Upon receiving the Contact Verification Signal frame, the dependent STA determines validity of the existing WSM thereof by comparing a Map ID included in the Contact Verification Signal frame with a Map ID of the existing WSM thereof in step S1030.

If the Map ID included in the Contact Verification Signal frame is the same as the Map ID of the existing WSM belonging to the dependent STA, the dependent STA determines that the existing WSM thereof is valid and operates within available channels included in the WSM.

If the Map ID included in the Contact Verification Signal frame is different from the Map ID of the existing WSM belonging to the dependent STA, the dependent STA determines that the existing WSM thereof is invalid. If it is determined that the existing WSM is invalid, the dependent STA transmits a WSM request message to the enabling STA to receive an updated WSM. For example, in order to request the updated WSM, the dependent STA may transmit a Channel Availability Query request frame to the enabling STA to receive a Channel Availability Query response frame including a WSM from the enabling STA. Upon receiving the updated WSM, the dependent STA should operate within available channels included in the updated WSM.

However, if the dependent STA does not receive a contact verification signal within a determined time and does not receive an updated new WSM from the enabling STA, or if it receives the contact verification signal indicating that a WSM has been updated but does not receive the updated new WSM from the enabling STA, the dependent STA should stop action in a corresponding band and signal transmission and should be disabled.

Alternatively, a WSM element which includes only a Map ID of a currently valid WSM without an available channel information may be the first type of message indicating validity of a WSM. Namely, in order to inform a dependent STA of validity of a WSM, an enabling STA may set the length of the WSM element to 1 and transmit the WSM element including only the Map ID of the currently valid WSM without the available channel information. Then the dependent STA determines whether a WSM has been updated through the received Map ID. If a map version of the received Map ID is different from a map version of a currently used WSM, the dependent STA determines that the currently used WSM is invalid. The dependent STA stops action in a TVWS until it obtains a new valid WSM. The dependent STA may receive a beacon frame to obtain a valid WSM or may receive the valid WSM by transmitting a WSM request to the enabling STA.

Figure 9:
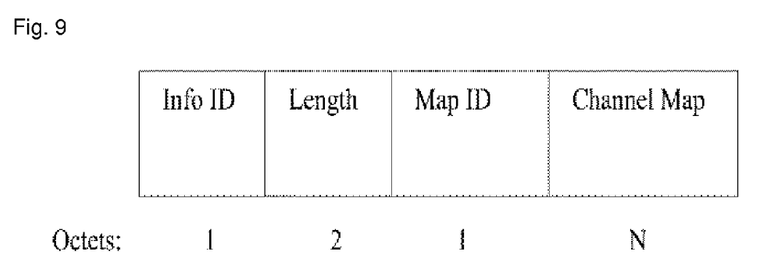
FIG. 9 is a diagram illustrating a format of a WSM element transmitted using an RLQP.

The enabling STA may transmit the WSM to the dependent STA using a Registered Location Query Protocol (RLQP). FIG. 9 is a diagram illustrating a format of a WSM element transmitted using an RLQP. As shown in FIG. 9, the WSM element transmitted using the RLQP includes an Info ID field, a Length field, a Map ID field, and a Channel Map field. The Info ID field indicates that a corresponding element is a WSM element. The Map ID field is shown in FIG. 6. The Channel Map field indicates information about available channels and may include the Channel Number field and the Maximum Power Level field shown in FIG. 5.

When a WSM is updated, the enabling STA may broadcast the WSM element to dependent STAs through the RLQP in order to inform the dependent STAs that the WSM has been updated. In this case, the Length field of the WSM element is set to 1. The WSM element includes a Map ID of a currently valid WSM and does not include an available channel information.

Upon receiving the WSM element which does not include the available channel information through the RLQP, the dependent STA determines whether an existing WSM thereof is valid by checking the map version included in the Map ID. If the map version of the WSM element received through the RLQP is different from the map version of the existing WSM belonging to the dependent STA, the dependent STA determines that the WSM has been updated.

The dependent STA, which has determined that the WSM has been updated, transmits a WSM request frame to the enabling STA in order to receive the updated WSM. For example, the dependent may transmit a GAS Initial Request frame to the enabling STA to request the WSM. The enabling STA transmits a GAS Initial Response frame including the WSM to the dependent STA as a response to the GAS Initial Request frame.

However, if the dependent STA has an invalid WSM due to update of the WSM, in some cases, the dependent STA cannot transmit the WSM request frame in a TVWS. Then, it is more efficient for the enabling STA to transmit information about available channels to the dependent STA in a broadcast form rather than to inform the dependent STA that the WSM has been updated.

Next, the second type of message indicating validity of a WSM is described with reference to FIGS. 10 and 11. As described previously, the second type of message includes a Hash value to indicate whether a WSM has been updated.

Figure 10:
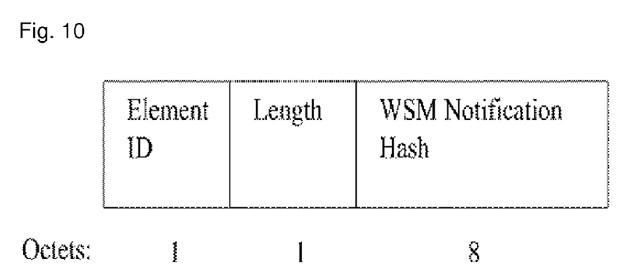
FIG. 10 is a diagram illustrating an element indicating validity of a WSM.
Figure 11:
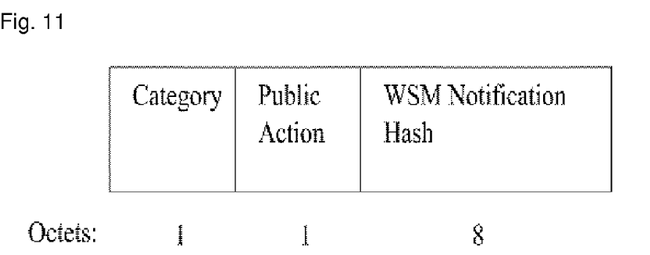
FIG. 11 is a diagram illustrating a frame indicating validity of a WSM.

FIG. 10 is a diagram illustrating an element indicating validity of a WSM, and FIG. 11 is a diagram illustrating a frame indicating validity of a WSM.

In an exemplary embodiment of the present invention, the element for indicating validity of a WSM as shown in FIG. 10 is referred to as a WSM Notification element, and a frame for indicating validity of a WSM as shown in FIG. 11 is referred to as a WSM Notification frame.

As shown in FIG. 10, the WSM Notification element includes an Element ID field, a Length field, and a WSM Notification Hash field.

The Element ID field indicates that a corresponding element is a WSM Notification element. The Length field is set to 8.

The WSM Notification Hash field is an 8-octet field. A value of the WSM Notification Hash field is a Hash value obtained by performing a Hash algorithm upon a value of the WSM information field of a currently valid WSM and an ID of an enabling STA or a dependent AP which transmits a WSM Notification element. The WSM Notification Hash (WSNH) value may be determined by Equation 1.

$$\text{WSMH=HMAC-SHA1-64(``WSM'',} \\ \text{WSM\_Information} \| \text{ResponderSTAAddress)} \quad \{\text{Equation 1}\}$$

In Equation 1, WSM_Information indicates a value of the WSM information field of a currently valid WSM, and ResponderSTAAddress may be an address of an enabling STA or a dependent AP which transmits the WSM Notification element. WSM_Information∥ResponderSTAAddress indicates that WSM information and ResponderSTAAddress are interlocked to obtain WSNH.

The enabling STA or the dependent AP may include the WSM Notification element in a beacon frame, a probe response frame, or a WSM Notification frame during transmission.

Upon receiving the WSM Notification element, the dependent STA judges whether a WSM which is being used thereby is valid using the WSM Notification Hash of the WSM Notification element. If it is judged that the WSM is invalid, the dependent STA requests the enabling STA or dependent AP to transmit a valid WSM. To request a valid WSM, the dependent STA may transmit a WSM request frame to receive a WSM response frame. Alternatively, the dependent STA may transmit a WSM request element using a GAS protocol to receive a WSM element using the GAS protocol.

Figure 12:
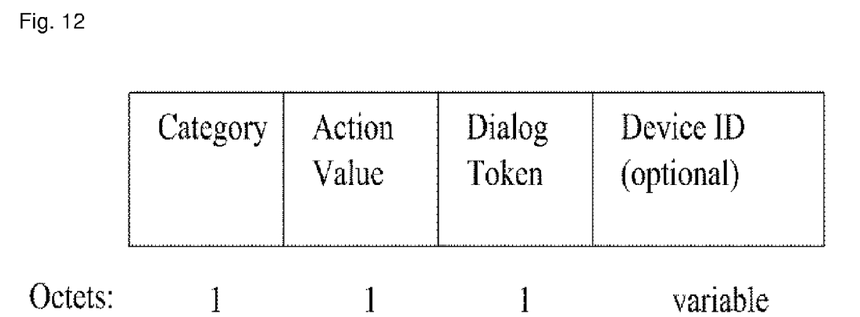
FIG. 12 is a diagram illustrating a format of a WSM request frame.

FIG. 12 is a diagram illustrating a format of a WSM request frame. As shown in FIG. 12, the WSM request frame includes a Category field, an Action Value field, a Dialog Token field, and a Device ID field.

The Action Value field indicates that a corresponding frame is a WSM request field. The Dialog Token field represents a value for identifying transaction and an arbitrary value, except for 0, selected by an STA which transmits the WSM request frame. The Device ID field indicates an ID of an STA which transmits the WSM request frame.

Figure 13:
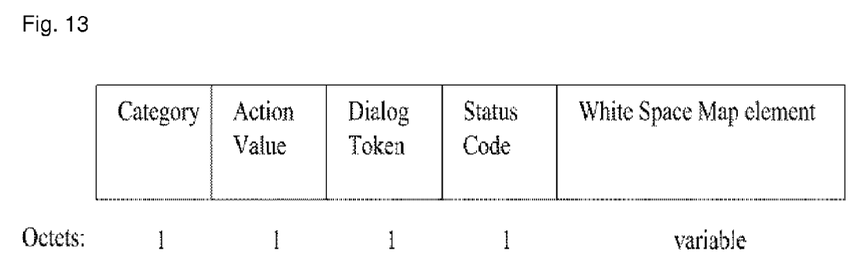
FIG. 13 is a diagram illustrating a format of a WSM response frame.

FIG. 13 is a diagram illustrating a format of a WSM response frame. As shown in FIG. 13, the WSM response frame includes a Category field, an Action Value field, a Dialog Token field, a Status Code field, and a White Space Map element.

The Action Value field indicates that a corresponding frame is a WSM response frame. The Dialog Token field is set to a value of a Dialog Token field of a corresponding WSM request frame.

A value of the Status Code field is defined in Table 2.

TABLE 2

| Status Code Value | Description |
| --- | --- |
| 0 | Reserved |
| 1 | Success |
| 2 | Request denied because Device ID is not valid |
| 3-255 | Reserved |

Upon receiving the WSM request frame, an enabling STA or a dependent AP determines whether a value of the Device ID of the WSM request frame is valid. If the value of the Device ID field of the WSM request frame is valid, the Status Code field is set to 1 and the WSM response frame includes a White Space Map element field. However, if the value of the Device ID field of the WSM request frame is invalid, the Status Code field is set to 2 and the WSM response frame does not include the White Space Map element field. The White Space Map element field is the same as the WSM element shown in FIG. 4.

The dependent STA should receive a WSM Notification element at a preset interval. If no WSM Notification element is received at the preset interval, the dependent STA should stop transmitting signals in a TVWS band and should be disabled.

The WSM Notification element may be used as a signal for terminating an action of an STA. Namely, a WSM Notification element which does not include a WSM Notification Hash field may be defined as a signal for terminating an action of an STA. Upon receiving the WSM Notification element which does not include the WSM Notification Hash field, an STA confirms that there are no available channels and stops transmission of all signals in a corresponding band (e.g. a TVWS band) immediately or within a time requested in a system or a corresponding regulatory domain.

Additionally, a method for transmitting transmission information of a message indicating validity of a WSM to an STA in sleep mode will be described.

If an STA enters sleep mode for battery power saving, especially if availability of a specific channel is changed due to a long sleep duration, the STA may not know the fact that availability of the channel has been changed. If the STA wakes from sleep mode, it should query to determine changes in available channel information by accessing an AP and, more desirably, should request and receive a WSM. However, if all STAs in sleep mode transmit a WSM request frame to the AP whenever waking from sleep mode, overhead and interference increase.

In an exemplary embodiment of the present invention, a method is proposed in which an STA determines whether an existing WSM thereof has been changed through a specific signal when an STA wakes from sleep mode, and transmits a WSM request frame only when the WSM has been changed. The specific signal may be a WSM Notification element. In order for an STA in sleep mode to receive a message indicating validity of a WSM, the STA should wake at a transmission time point of a message indicating validity of the WSM and should receive the message indicating validity of the WSM. To this end, the STA should be aware of delivery offset information, and a delivery interval at which the message indicating validity of a WSM is delivered.

Accordingly, in an exemplary embodiment of the present invention, a method is proposed for informing an STA of delivery offset information and a delivery interval at which the message indicating validity of a WSM is delivered. A time point when an AP informs an STA of transfer information of the message indicating validity of a WSM may be a transfer time point of the WSM. That is, the transfer time point of the WSM may be when an Enablement Response frame, a beacon frame, a probe response frame, and a WSM response frame are transmitted. In this case, a delivery offset and a delivery interval should be included. The delivery offset indicates when a WSM Notification element is to be transmitted relative to a current time point. The delivery interval indicates a transfer interval of a message indicating validity of the WSM. The delivery offset and the delivery interval may be expressed in transmission units of a beacon frame.

In an exemplary embodiment of the present invention, although a frame format of a delivery information element of a message indicating validity of a WSM is described based on a WSM Notification delivery information element, it may be identically applied to other contact verification signals.

Figure 14:
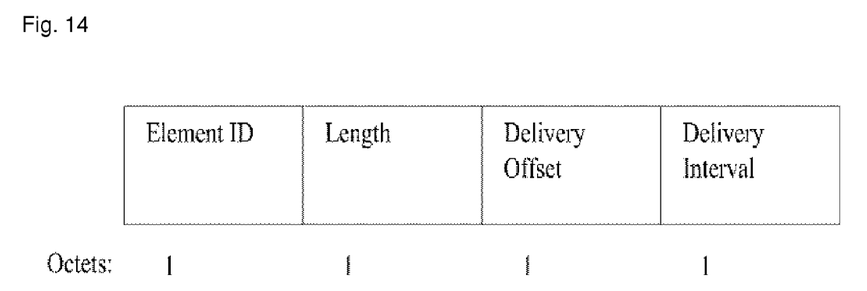
FIG. 14 is a diagram illustrating a WSM Notification Delivery Information Element.

FIG. 14 is a diagram illustrating a WSM Notification Delivery Information Element. As shown in FIG. 14, the WSM Notification Delivery Information Element includes a Delivery Offset field and a Delivery Interval field. The WSM Notification Delivery Information Element may be included in a beacon frame or a TIM frame during transmission.

Although STAs in sleep mode recognize transfer information of the WSM Notification element, they do not always need to receive the WSM Notification element in sleep mode. However, when the sleep mode is changed to an active mode, the STA should receive the WSM Notification element and determine whether an available channel information has been changed. If the available channel information has not been changed, the STA uses an existing WSM, and if it has been changed, the STA requests a WSM.

In some case, an STA may not receive the WSM Notification element after waking from sleep mode according to information of the WSM Notification Delivery Information Element. This is the case where a serving AP of the STA moves to another channel or WSM Notification Delivery Information has been changed. In this case, the STA transmits a WSM request frame after receiving a broadcast signal such as a beacon frame transmitted by a corresponding AP. According to an exemplary embodiment of the present invention, action of an STA violating delivery and regulation can be prevented.

Figure 15:
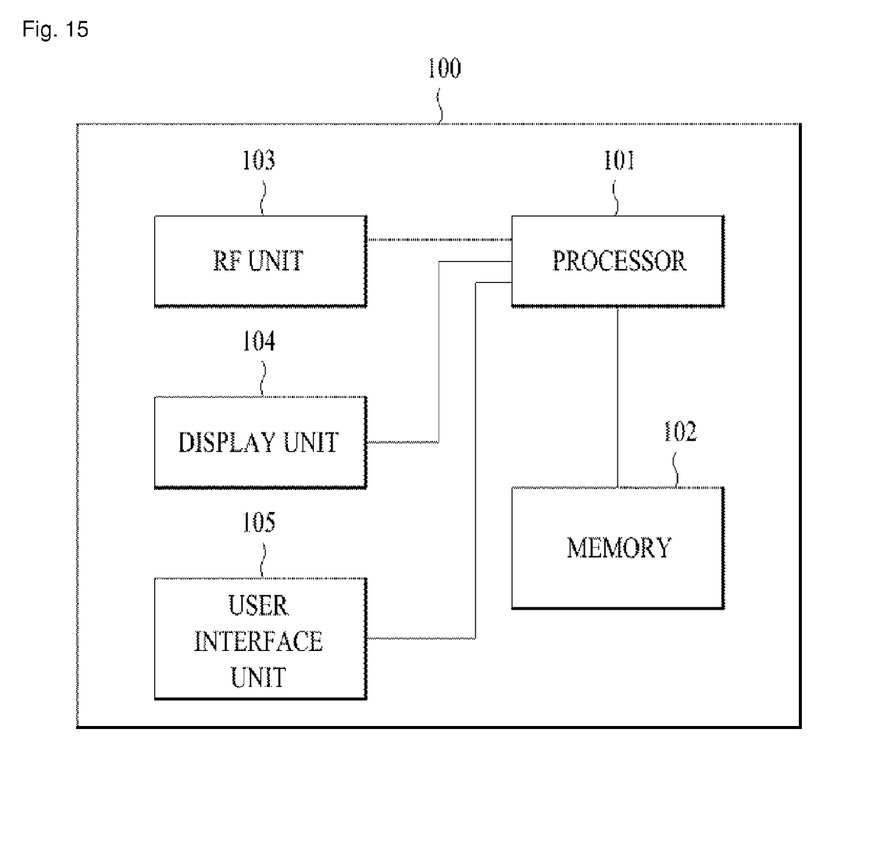
FIG. 15 is a block diagram of a device which can be applied to an STA or an AP and can implement the present invention.

FIG. 15 is a block diagram of a device which can be applied to an STA or an AP and can implement the present invention. As shown in FIG. 15, a device 100 includes a processor 101, a memory 102, a Radio Frequency (RF) unit 103, a display unit 104, and a user interface unit 105.

A layer of a physical interface protocol is performed in the processor 101. The processor 101 provides a control plane and a user plane. A function of each layer may be performed in the processor 101.

The memory 102 is electrically connected to the processor 101 and stores operating systems, application programs, and general files.

If the device 100 is a UE, the display unit 104 may display various information and may be comprised of a known Liquid Crystal Display (LCD), an Organic Light Emitting Diode (OLED), etc. The user interface unit 105 may be combined with a known user interface such as a keypad, a touchscreen, etc.

The RF unit 103 is electrically connected to the processor 101 and transmits or receives radio signals. The RF unit 103 may include a transmission module and a reception module.

The transmission module may be scheduled from the processor 101 to perform coding and modulation with respect to signals and/or data to be transmitted to the exterior and may transmit the coded and modulated signals and/or data to antennas.

The reception module may perform decoding and demodulation with respect to radio signals received through external antennas to restore the radio signals to original data and may transmit the restored data to the processor 101.

The detailed description of the exemplary embodiments of the present invention disclosed as described above has been presented to enable any person of ordinary skill in the art to make and practice the present invention. Modifications to the preferred embodiment will be readily apparent to those of ordinary skill in the art, and the disclosure set forth herein may be applied to other embodiments and applications without departing from the spirit and scope of the present invention and the appended claims. Thus, the present invention is not intended to be limited to the embodiments described, but is to be accorded the broadest scope consistent with the claims appended hereto and the disclosure set forth herein.

INDUSTRIAL APPLICABILITY

Although various embodiments of the present invention have been described based on the IEEE 802.11 system, they may be applied in the same way to a variety of mobile communication systems which can operate by acquiring available channel information by an unlicensed device.

The invention claimed is:

1. A method for a first station (STA) to operate as an unlicensed device which is permitted to operate on an available channel within a White Space (WS) band of a wireless system, the method comprising:

receiving a message indicating whether a White Space Map (WSM) of the first STA is valid from a second STA, wherein the available channel is a channel not used by a licensed device and allowed for operation by a unlicensed device, wherein the message includes a Map ID of a current WSM;

determining whether an existing WSM of the first STA is valid by comparing a Map ID of the WSM of the first STA with the Map ID included in the received message, wherein the Map ID, included in the received message, includes a Map version indicating a version of the WSM, and wherein a value of the Map version increases by one whenever the WSM is updated; and requesting the second STA to transmit a valid WSM, if the Map ID of the existing WSM of the first STA is different from the Map ID included in the received message.

2. The method of claim 1, wherein the determination includes:

determining that the existing WSM of the first STA is valid if the Map ID of the existing WSM of the first STA is the same as the Map ID included in the received message; and determining that the existing available channel information of the first STA is invalid if the Map ID of the existing available channel information of the first STA is different from the Map ID included in the received message.

3. The method of claim 1, further comprising receiving the valid WSM from the second STA.

4. The method of claim 1, wherein the second STA is a STA which had provided the first STA with the existing WSM of the first STA.

5. The method of claim 1, wherein the message further includes a Length field indicating the length of information included in the message in units of octets; and the Length field is set to 1.

6. The method of claim 5, wherein the message is received at a preset interval.

7. The method of claim 5, further comprising stopping transmitting and receiving signals in the WS band when the message is not received at the preset interval.

8. A method of a second station (STA) for controlling a first STA to operate as an unlicensed device which is permitted to operate on an available channel within a White Space (WS) band of a wireless system, the method comprising:
- transmitting a message indicating whether an White Space Map (WSM) of the first STA is valid to the first STA,
- wherein the available channel is a channel not used by a licensed device,
- wherein the message includes a Map ID of a current valid WSM,
- wherein the MAP ID of the current valid WSM is used by the first STA to determine whether the existing WSM of the first STA is invalid based on a comparison of the Map ID of the current valid WSM to a Map ID of the existing WSM, and
- wherein the Map ID, included in the received message, includes a Map version indicating a version of the WSM, and wherein a value of the Map version increases by one whenever the WSM is updated; and
- receiving a request for a valid WSM from the first STA, when the Map ID of the current valid WSM is different from the Map ID of the existing WSM of the first STA.

9. The method of claim 8, further comprising transmitting the valid WSM to the first STA.

10. The method of claim 8, wherein the second STA is a STA which had provided the first STA with the existing WSM of the first STA.

11. The method of claim 8, wherein:
- the message further includes a Length field indicating the length of information included in the message in units of octets; and
- the Length field is set to 1.

12. A first station (STA) operating as an unlicensed device which is permitted to operate on an available channel within a White Space (WS) band of a wireless system, the first STA comprising:
- a reception module for:
  - receiving a message indicating whether an WSM of the first STA is valid from a second STA,
  - wherein the available channel is a channel not used by a licensed device, and
  - wherein the message includes a Map ID of a current valid WSM; and
- a processor for:
  - determining whether an existing WSM of the first STA is valid by comparing a Map ID of the existing WSM of the first STA with the Map ID included in the received message,
  - wherein the Map ID, included in the received message, includes a Map version indicating a version of the WSM, and
  - wherein a value of the Map version increases by one whenever the WSM is updated; and
  - requesting the second STA to transmit a valid WSM, if the Map ID of the existing WSM of the first STA is different from the Map ID included in the received message.

13. A second station (STA) controlling a first STA to operate as an unlicensed device which is permitted to operate on an available channel within a White Space (WS) band of a wireless system, the second STA comprising:
- a transmission module for:
  - transmitting a message indicating whether an White Space Map (WSM) of the first STA is valid to the first STA,
  - wherein the available channel is a channel not used by a licensed device,
  - wherein the message includes a Map ID of a current valid WSM,
  - wherein the Map ID of the current valid WSM is used by the first STA to determine whether the existing WSM of the first STA is invalid based on a comparison of the Map ID of the current valid WSM with a Map ID of the existing WSM,
  - wherein the Map ID, included in the received message, includes a Map version indicating a version of the WSM, and
  - wherein a value of the Map version increases by one whenever the WSM is updated; and
  - receiving a request for a valid WSM from the first STA, when the Map ID of the current valid WSM is different from the Map ID of the existing WSM of the first STA.

* * * * *